US010327301B2

(12) United States Patent
Pilz et al.

(10) Patent No.: US 10,327,301 B2
(45) Date of Patent: Jun. 18, 2019

(54) CIRCUIT ARRANGEMENT FOR OPERATING LIGHT SOURCES AND SENSOR FOR CONNECTION TO A CIRCUIT ARRANGEMENT

(71) Applicant: OSRAM GmbH, Munich (DE)

(72) Inventors: Axel Pilz, Neuenstein (DE); Markus Heckmann, Munich (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/846,278

(22) Filed: Dec. 19, 2017

(65) Prior Publication Data

US 2018/0184496 A1 Jun. 28, 2018

(30) Foreign Application Priority Data

Dec. 22, 2016 (DE) ........................ 10 2016 226 016

(51) Int. Cl.
*H05B 33/08* (2006.01)
*H05B 37/02* (2006.01)
*G01V 8/10* (2006.01)

(52) U.S. Cl.
CPC ........... *H05B 33/0854* (2013.01); *G01V 8/10* (2013.01); *H05B 33/0869* (2013.01);
(Continued)

(58) Field of Classification Search
CPC ........................ H05B 33/0845; H05B 37/0227
(Continued)

(56) References Cited

U.S. PATENT DOCUMENTS 7,378,805 B2 * 5/2008 Oh ..................... H05B 33/0815 315/219
2009/0195168 A1 * 8/2009 Greenfeld .......... H05B 33/0815 315/192

(Continued)

FOREIGN PATENT DOCUMENTS

AT 14580 U1 1/2016
AU 2008328233 B2 7/2014

(Continued)

OTHER PUBLICATIONS

German Search Report based on application No. 10 2016 226 016.2 (8 pages) dated Aug. 31, 2017 (Reference Purpose Only).

(Continued)

*Primary Examiner* — Tung X Le
(74) *Attorney, Agent, or Firm* — Viering, Jentschura & Partner MBB

(57) ABSTRACT

In various embodiments, a circuit arrangement for operating light sources is provided. The circuit arrangement includes an input for inputting an input voltage, an output for outputting an output current, a first interface for controlling the circuit arrangement, and a second interface. The circuit arrangement is configured to set two different operating modes: in a first operating mode the circuit arrangement is configured to be controlled via the first interface and to receive information concerning the output current via the second interface and to correspondingly set the output current at the output, and in a second operating mode the circuit arrangement is configured to be controlled and to receive the information about the output current to be set at the output via the first interface, and to receive information from a sensor via the second interface and to process said information.

15 Claims, 7 Drawing Sheets

(52) U.S. Cl.
CPC ......... *H05B 33/0872* (2013.01); *H05B 37/02* (2013.01); *H05B 37/0218* (2013.01)

(58) Field of Classification Search
USPC .................................................. 315/151, 307
See application file for complete search history.

(56) References Cited

U.S. PATENT DOCUMENTS

| | | | | |
|---|---|---|---|---|
| 2011/0260619 | A1 | 10/2011 | Sadwick et al. | |
| 2012/0306377 | A1* | 12/2012 | Igaki | F21V 23/0464 315/151 |
| 2013/0249410 | A1* | 9/2013 | Thompson | H05B 37/0227 315/158 |
| 2015/0351173 | A1 | 12/2015 | Dunser et al. | |
| 2016/0143106 | A1* | 5/2016 | Scheidegger | H05B 33/0845 315/291 |
| 2017/0027488 | A1* | 2/2017 | Enenkel | A61B 5/14552 |

FOREIGN PATENT DOCUMENTS

| | | | |
|---|---|---|---|
| DE | 102007055164 | A1 | 5/2009 |
| DE | 102013221496 | A1 | 4/2015 |
| DE | 102013226964 | A1 | 6/2015 |
| DE | 102014104447 | A1 | 10/2015 |
| DE | 102014208710 | A1 | 11/2015 |
| EP | 3001778 | A1 | 3/2016 |
| WO | 2015067757 | A1 | 5/2015 |

OTHER PUBLICATIONS

Ledset, "LEDset Power Interface Specification", retrieved Dec. 20, 2016, from hftp://wwww.zhaqastandard.org/data/downloadables/9/2/2/ledset-power-interface-specification-v10.pdf?force-download=yes.

European Search Report based on Application No. EP 17 20 7197 (8 pages) dated Apr. 20, 2018 (for reference purpose only).

* cited by examiner

CIRCUIT ARRANGEMENT FOR OPERATING LIGHT SOURCES AND SENSOR FOR CONNECTION TO A CIRCUIT ARRANGEMENT

CROSS-REFERENCE TO RELATED APPLICATION

This application claims priority to German Patent Application Serial No. 10 2016 226 016.2, which was filed Dec. 22, 2016, and is incorporated herein by reference in its entirety.

TECHNICAL FIELD

Various embodiments relate generally to a circuit arrangement for operating light sources and a sensor for connection to said circuit arrangement, wherein the sensor communicates brightness values and presence information to the circuit arrangement.

BACKGROUND

Especially for intelligent individual luminaires (e.g. standard luminaires), an automatic daylight- and presence-dependent light control is increasingly being stipulated in specifications. Reasons for this include increased convenience demands, in the form of a constant illuminance on the work surface, with at the same time more restrictive stipulations for the maximum energy consumption. The German energy saving regulations (ENEV) and the European Energy Performance of Buildings Directive (EPBD) shall be mentioned here. Increasingly simple and cost-effective solutions are therefore being demanded. This means, inter alia, that the function of daylight regulation and presence detection should be realized with the fewest possible components. Like all electronic devices, said components require an energy supply that is efficient enough to ensure a low standby power consumption of the overall solution.

LED technology not only makes it possible to develop ever more efficient luminaires, but offers new freedoms of design. This freedom of design arises not just from the possibility of flexibly arranging the individual LEDs on freely configurable circuit board shapes/circuit board formats, but also, in particular, from the small structural height of the LED modules. The limitation of the minimum luminaire structural height that can be realized is currently determined solely by the structural height of the LED driver and of the light control components to be integrated into the luminaire.

To summarize, the lighting industry is thus confronted with two problems to be solved simultaneously: firstly, the need for simple, cost-effective daylight- and presence-dependent light control solutions consisting of the fewest possible components. Secondly, the structural height of the components used ought to be as small as possible, with a permanent efficient energy supply being required at the same time.

The solutions that have been commercially available hitherto are oriented toward the de facto standard structural height of the LED drivers of 21 mm. In general, the solutions for individual luminaires consist of one or a plurality of dimmable LED drivers, a control device and at least one light/presence sensor.

In already optimized/simplified systems, the control device is obviated; this function is performed by either the sensor or alternatively the LED driver itself. For these systems there are two solutions for the connection of the sensor:

a) Connection of the sensor via the existing digital addressable lighting interface (DALI) of the driver. For this purpose, either the normally passive DALI interface of the driver has to be modified to form an active DALI interface, which supplies a DALI current for the supply of external components, or a DALI power supply unit has to be integrated into the sensor. Disadvantages include, firstly, a higher outlay on component parts and, secondly, a higher standby power.

b) The LED driver has an additional interface for the sensor connection. The main disadvantage is the higher outlay on component parts, and the additional terminals.

SUMMARY

In various embodiments, a circuit arrangement for operating light sources is provided. The circuit arrangement includes an input for inputting an input voltage, an output for outputting an output current, a first interface for controlling the circuit arrangement, and a second interface. The circuit arrangement is configured to set two different operating modes: in a first operating mode the circuit arrangement is configured to be controlled via the first interface and to receive information concerning the output current via the second interface and to correspondingly set the output current at the output, and in a second operating mode the circuit arrangement is configured to be controlled and to receive the information about the output current to be set at the output via the first interface, and to receive information from a sensor via the second interface and to process said information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

Some configurations of the invention will now be explained below. To ensure definite assignment, some definitions of terms will now follow: the circuit arrangement 1 in the configurations is preferably a light emitting diodes (LED) driver, an electronic ballast for LEDs and LED modules. Therefore, the term LED driver hereinafter is used synonymously with the term circuit arrangement.

The LED driver likewise includes two interfaces; the first interface is a DALI interface. DALI here stands for “Digital Adressable Light Interface” and has been an interface standard in the light industry for many years. Therefore, the term “DALI interface” hereinafter is used synonymously with “first interface”. The second interface 17 is an LED set interface, via which the current requirement of all the connected LED modules is reported to the circuit arrangement. The LED set interface is a very simple and functional analog interface which is gaining acceptance more and more in the field of lighting. The specification can be viewed via the Zhaga Consortium:

http://wwww.zhaqastandard.org/data/downloadables/9/2/2/ledset-power-interface-specification-v10.pdf?force-download=yes (retrieved on Dec. 20, 2016). Therefore, the term “LED set interface” hereinafter is used synonymously with the term “second interface”.

Figure 1:
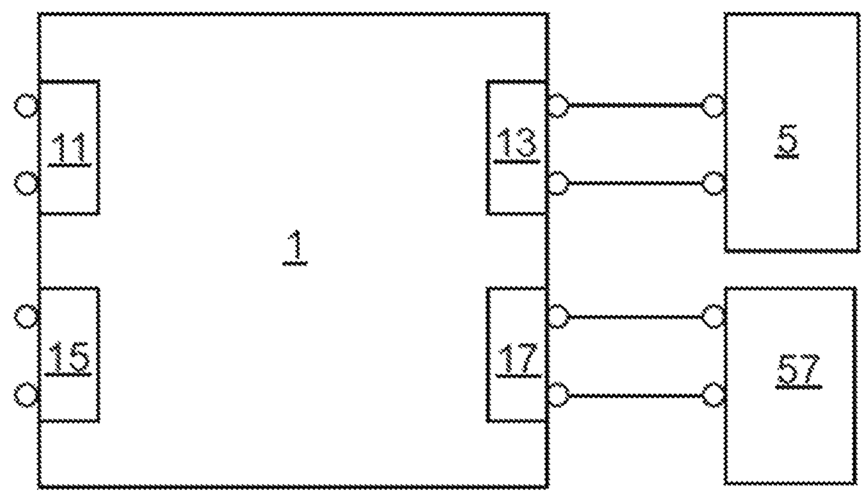
FIG. 1 shows various embodiments of the circuit arrangement in a first operating mode.

FIG. 1 shows various embodiments of the circuit arrangement 1 in a first operating mode, in which an LED module 5 is connected to the output 13 and an interface 57 with a current setting circuit is connected to the second interface 17 of the circuit arrangement. The LED module 5 can also itself have an interface 57 with the current setting circuit, which is connected to the second interface 17 of the LED driver, in order to report the current requirement of the LED module 5 to the circuit arrangement. For this purpose, the LED driver 1 includes a voltage source coupled to the second interface 17. Furthermore, a current measuring device is connected to the second interface 17. The second interface thus impresses a predetermined voltage into the LED module 5 via the voltage source and in the process measures the current present at the second interface. In this case, the measured current then determines the output current that the circuit arrangement applies to the LED module 5 via the output 13. The higher the measured current at the interface 17, the higher the output current of the LED driver. The current is determined by a resistance in the interface 57 (of the LED module 5), the value of which resistance identifies the current requirement of the LED module 5. The smaller the resistance value, the greater the current requirement of the module. For this reason, with this LEDset interface it is possible also to connect a plurality of modules in parallel. In the event of the resistances of the LED modules being connected in parallel, the value of the resulting total resistance decreases, which indicates a greater current requirement. The standard voltage of the interface is 5 V.

The LED driver can be controlled via a first interface 15; for example, the LED module 5 can be switched on and off and dimmed. The first interface 15 is configured here as a DALI interface. The circuit arrangement 1 furthermore includes an input 11 for inputting an input voltage. The input voltage can be an electrical system AC voltage or a DC voltage (in the case of LED drivers with an emergency current capability).

Figure 2:
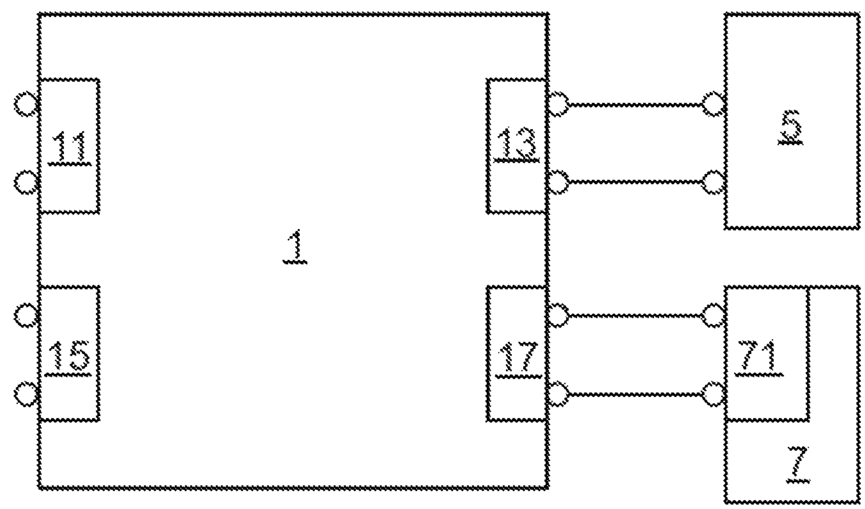
FIG. 2 shows various embodiments embodiment of the circuit arrangement in a second operating mode.

FIG. 2 shows various embodiments of the LED driver 1 in a second operating mode, in which an LED module 5 is connected to the output 13 and a sensor 7 is connected to the second interface 17.

In this case, the output current of the LED driver 1 for the LED module 5 is set via the first interface 15. As a DALI interface, the current value can be transferred digitally and permanently stored in the circuit arrangement 1.

A sensor 7 is connected to the second interface 17. Since the second interface 17 is an LED set interface, the sensor can be supplied via the voltage source. The voltage source is designed such that it operates as a voltage source only up to a specific maximum current. If said maximum current is exceeded, then the voltage at the interface is no longer maintained and collapses. This ensures an efficient manner of operation of the second interface 17. The maximum current is dimensioned such that all known resistances that represent the current requirement of the known modules can still be reliably identified by way of the voltage dropped across the resistance. In the present case, the maximum current is fixed at 6 mA. If periodically different voltages levels are then impressed on the second interface 17 from the sensor 7 via the sensor interface 71, in order to transmit digital data, the output current is a maximum of 6 mA. The losses at the interface thus turn out not to be too high.

Conversely, the 6 mA suffices, however, to supply the sensor with the necessary power for the operation thereof.

Figure 3:
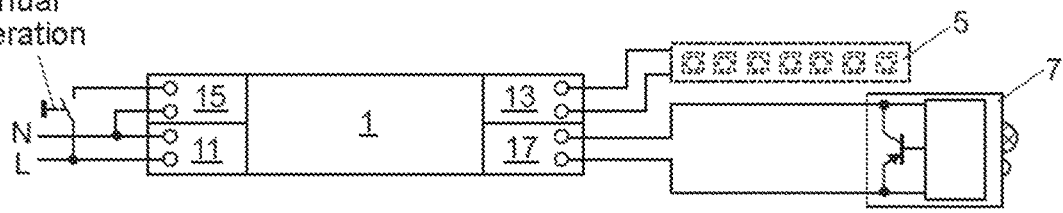
FIG. 3 shows the circuit arrangement in a further operating mode, in which a pushbutton for controlling the circuit arrangement is connected to the first interface, and where a sensor is connected to the circuit arrangement.

FIG. 3 shows the LED driver 1 in a further operating mode, in which a pushbutton for controlling the LED driver is connected to the first (DALI) interface. With the pushbutton, the LED module 5 can be switched on and off and dimmed. The term “touch-dim” has become commonly established for this. Using the DALI interface for this purpose is known. The combination with a pushbutton for control may be used in simple installations without a networked control system. The sensor can be used here, e.g. for complying with a specific illuminance. The LED module 5 is then operated with more or less dimming in a daylight-dependent manner.

Figure 4:
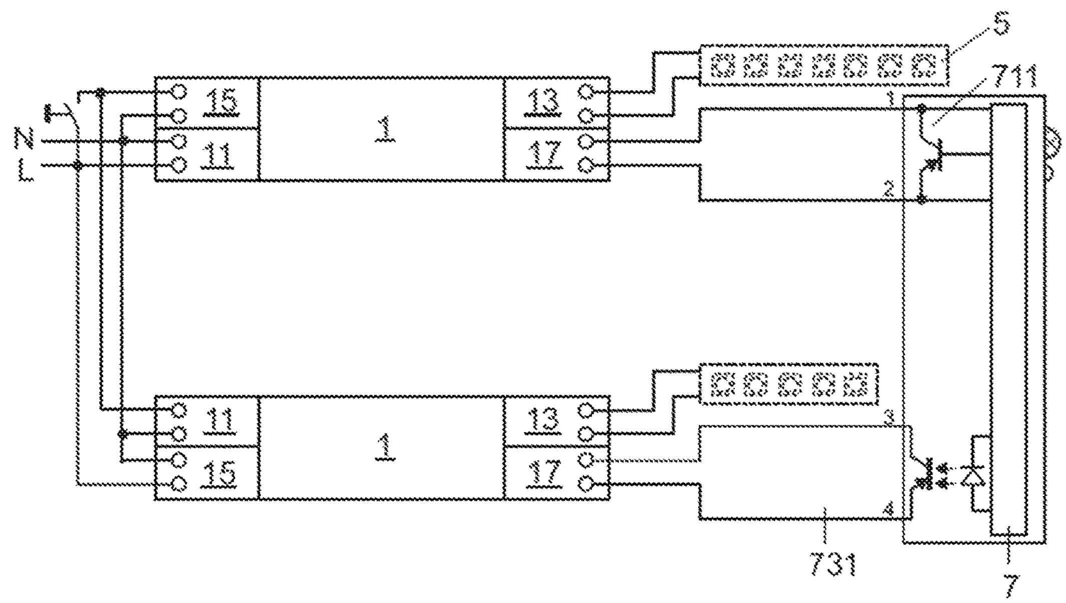
FIG. 4 shows the schematic diagram of an installation of two circuit arrangements with a pushbutton control and a connected sensor.

A further-reaching variant of the installation described is shown in FIG. 4. Two LED drivers 1 are used here in order to operate two LED modules 5 with a pushbutton control and a sensor 7. For this purpose, the sensor 7 includes two interfaces 71 and 73, which are galvanically isolated from one another and are connected respectively to an LED driver 1. The interface 71 simultaneously realizes the current supply of the sensor 7 via the first LED driver 1. Via the galvanically isolated interface 73, the same information is output to the second driver 1, such that both LED modules 5 connected to the two LED drivers equally obtain light, movement information and brightness information from the sensor. Since the LEDset interfaces 17 of the LED drivers are not permitted to be interconnected, a galvanic isolation is necessary.

Figure 5:
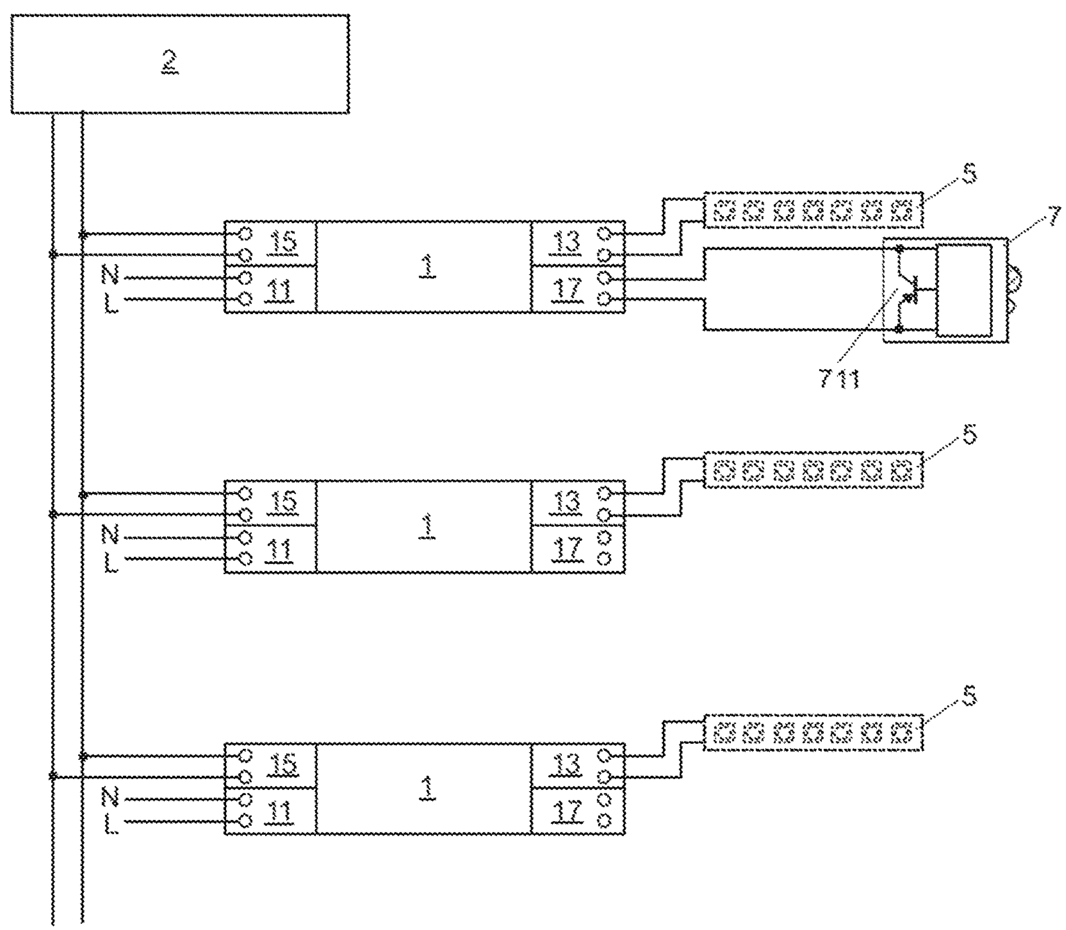
FIG. 5 shows a DALI installation where a plurality of circuit arrangements is connected to a superordinate DALI controller and a sensor is connected to one of the circuit arrangements, wherein the circuit arrangement converts the sensor signals and sends them to the superordinate DALI controller.

FIG. 5 in turn shows a more complex DALI installation including a plurality of LED drivers 1 and a superordinate DALI controller 2, which controls the installation. A sensor 7 is connected to one of the LED drivers 1, said sensor supplying its detected environment data to the LED driver 1.

In this case, the LED driver serves as a kind of gateway, converts the data, and sends them via the DALI line to the superordinate controller 2.

Figure 6:
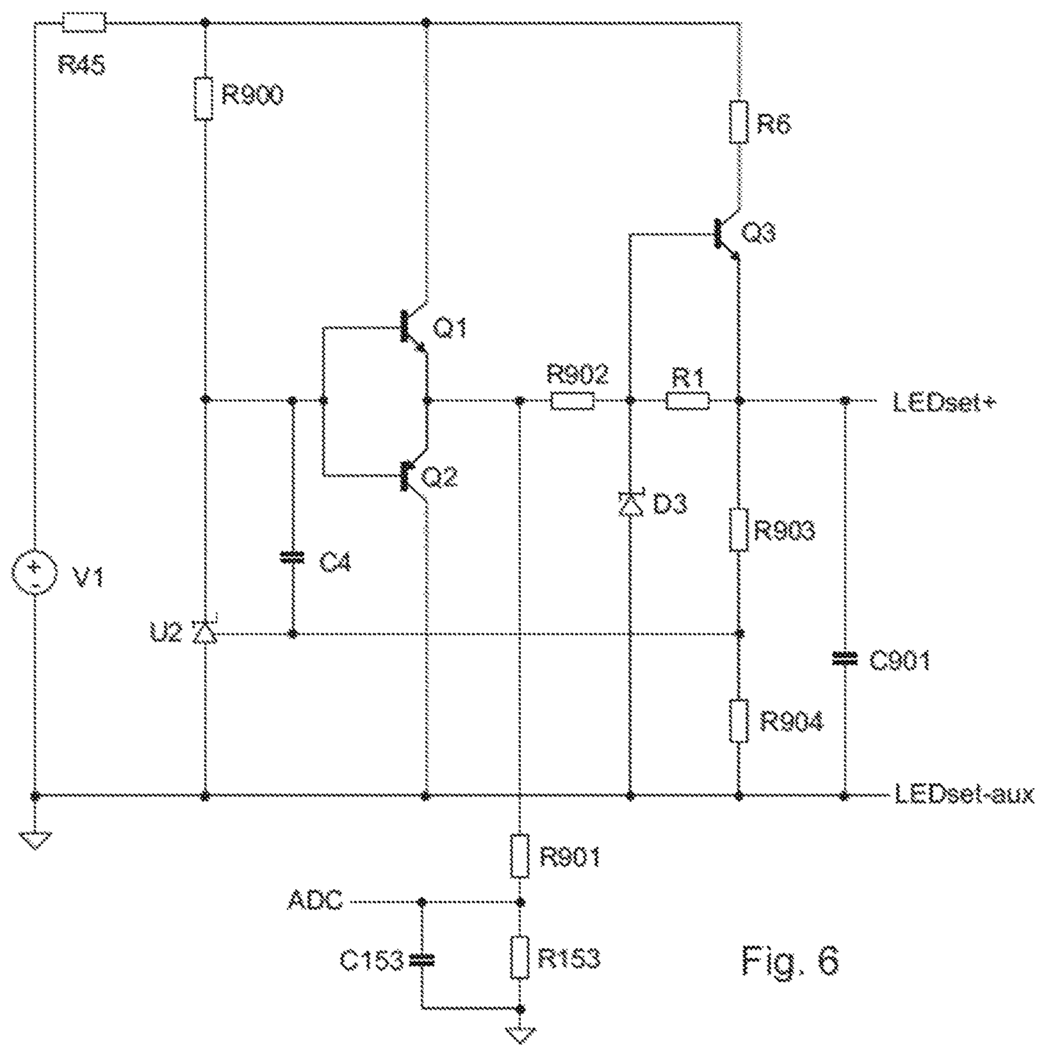
FIG. 6 shows a configuration of the interface of the circuit arrangement.

FIG. 6 shows a configuration of the interface 17 of the LED driver 1. A few additional components are required for the identification of the sensor signals and supply of the sensor. The normal function of the voltage supply of the interface is essentially realized by the two transistors Q1 and Q2, the adjustable voltage reference U2 together with the voltage divider including R903 and R904. The current measurement is carried out via the shunt R902 and the voltage divider R901 and R153. This measurement signal is input into the analog-to-digital conversion input ADC of a microcontroller (not shown) for further processing.

For the digital data transmission, this circuit is adapted by some further components. The diode D3 clamps the input voltage to a maximum value since after a short-circuiting of the output of the interface 17, the adjustable voltage reference U2, which reacts very slowly, causes an overshoot of the output voltage of the interface 17. The resistors R902 and R1 together serve as a current measuring resistor in the normal operating mode where the measured current value correlates with the current at the output 13 of the driver.

If a sensor 7 is connected to the interface, then higher currents flow, which increases the voltage dropped across the resistor R1. This may have the consequence that the transistor Q3 is turned on. Just a small change in the current, via the resistor R902, thus generates a high output current of the LED set interface 17. The measured current signal at the analog-to-digital conversion input ADC of the microcontroller remains approximately the same over a large current range of from approximately 1.2 mA to approximately 7 mA. These numerical values can be scaled to the requirements of the respective system.

The resistor R6 ensures current limiting of the output current of the LED set interface. As an alternative to R6, an active current limiting circuit can also be used. If this current limiting intervenes, then the transistor Q3 attains saturation and the current gain becomes smaller. As a consequence thereof, the voltage across the resistor R901 increases and will generate a larger signal at the analog-to-digital conversion input ADC. Therefore, if the LEDset interface is "short-circuited", then a characteristic HIGH signal is generated at the analog-to-digital conversion input ADC, while the signal is logic LOW if a current of from 0 mA to 7 mA flows at the output of the LEDset interface. The thresholds for identifying a logic HIGH and a logic LOW signal at the output of the LEDset interface 17 should therefore lie between these two characteristic values.

Lower loads at the output of the LEDset interface 17 always lead to a lower signal at the analog-to-digital conversion input ADC.

Figure 7:
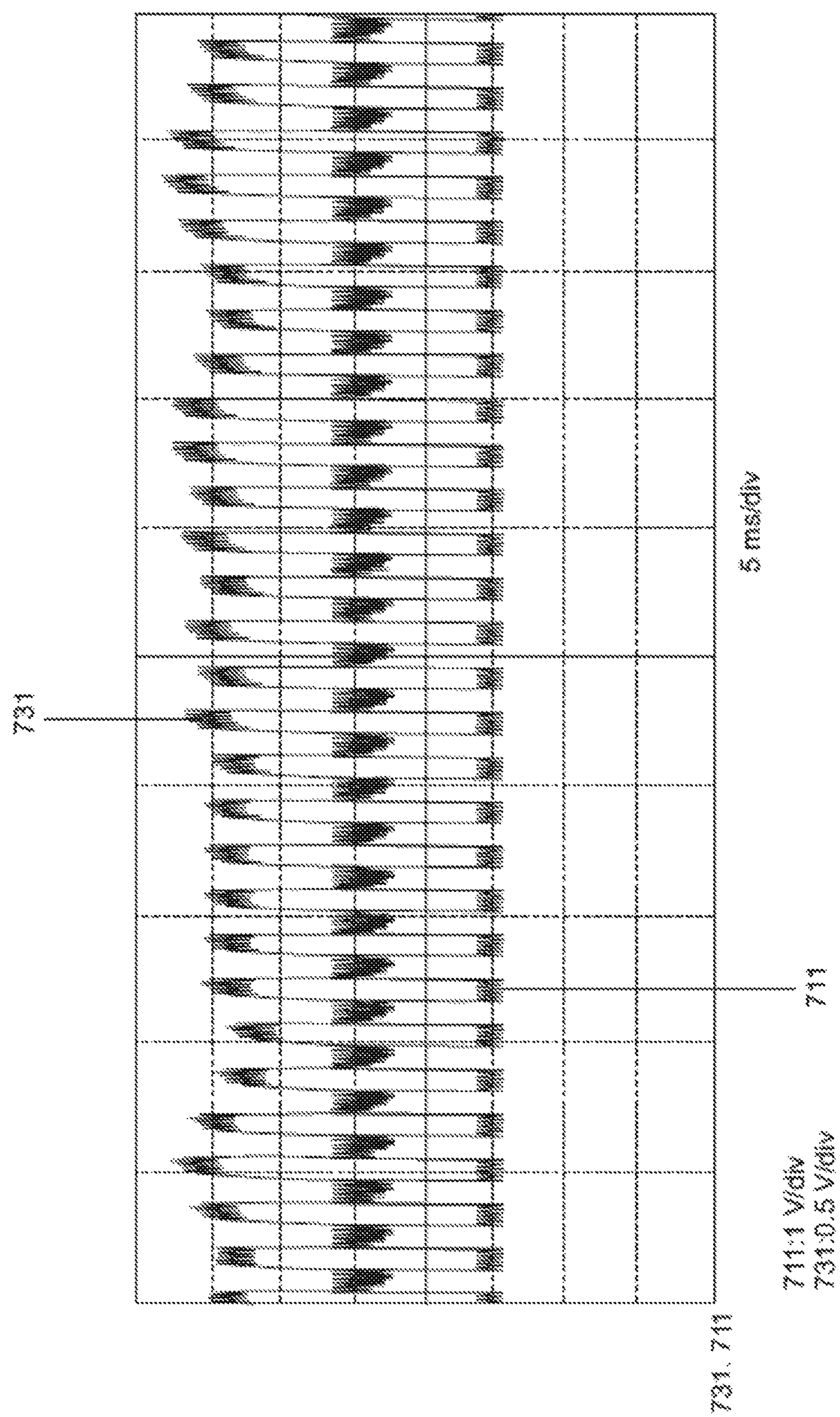
FIG. 7 shows characteristic curve profiles during operation with the sensor.

FIG. 7 shows the characteristic curve profiles during the manner of operation explained above. The curve 711 shows the voltage at the output of the LED set interface 17, which is modulated from 5V to 2.7V. The curve 731 shows the voltage at the analog-to-digital conversion input ADC of the microcontroller. It can immediately be discerned that the voltage at the analog-to-digital conversion input ADC of the microcontroller can easily be differentiated between logic LOW and logic HIGH if corresponding identification thresholds are set for the two states.

Figure 8:
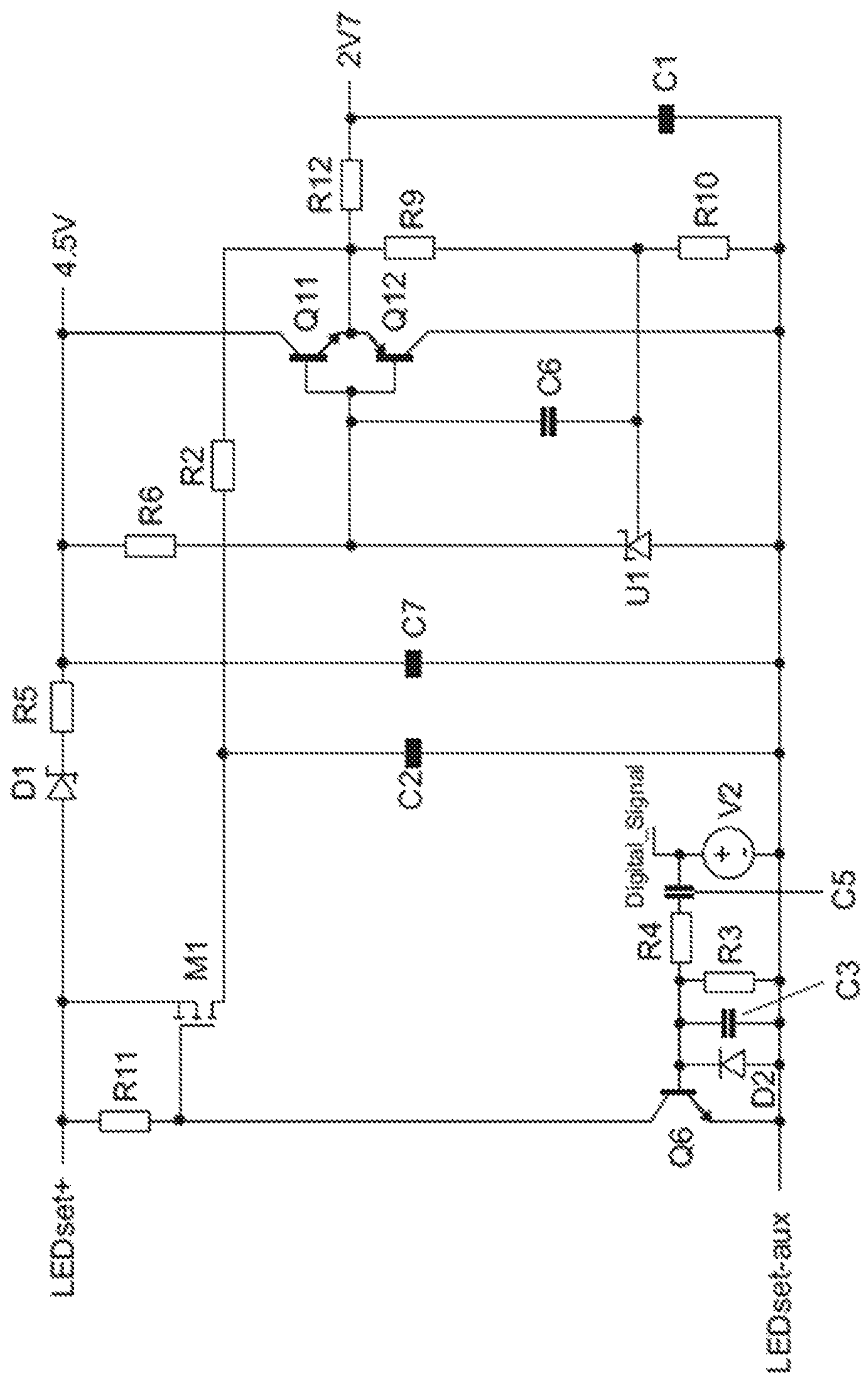
FIG. 8 shows a configuration of the interface of the sensor.

FIG. 8 shows a configuration of the interface 71 of the sensor 7. By virtue of the fact that upon the "short-circuiting" of the output of the LEDset interface 17, the voltage is "short-circuited" to 2.7V rather than to 0V, energy can be transmitted to the sensor for operation during both states of the output of the LEDset interface 17. The components D1, R5 and C7 are required by the LEDset interface 17 for the separation, buffering and filtering of the 4.5V. The components U1, R6, Q11, Q12, C6, R9 and R10 form a two-quadrant 2.7V voltage supply.

The switch M1 pulls the positive output of the LEDset interface 17 to the generated 2.7 V output rather than the negative output. Thus, even in the "short-circuited" operating state, the current from the output of the LED set interface is usable for the 2.7 V supply of the sensor 7, which overall drastically reduces the current requirement and greatly increases the performance of the two-quadrant 2.7V voltage supply of the sensor 7. By virtue of the fact that the voltage supply is constructed as a two-quadrant voltage supply, it can also draw current from the LED set interface 17 and thus supply the sensor.

Figure 9:
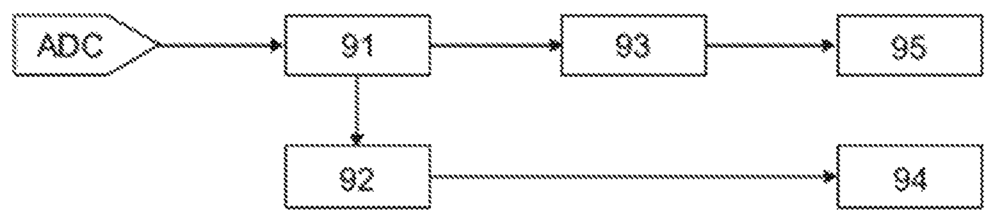
FIG. 9 shows a schematic status diagram of the software which processes the signals present at the A/D converter.

FIG. 9 shows a schematic status diagram of the software that processes the signals present at the A/D converter of the microcontroller. The signal is read into a logic 91, which thereupon evaluates the signal to determine whether it is a static signal or a clocked signal.

If the signal is identified as a static signal, then it is forwarded to a low-pass filter 93, which generates an analog voltage from the signal. This voltage is then processed further as measured LEDset current 95 in the circuit arrangement, that is to say that in accordance with the voltage a specific current is set at the output 13 of the circuit arrangement 1.

If the signal is identified as a clocked signal, then it is input into a packet decoder 92, which interprets the voltage edges and generates a corresponding bit sequence. This bit sequence is then forwarded as data packet 94 for further processing.

Figure 10:
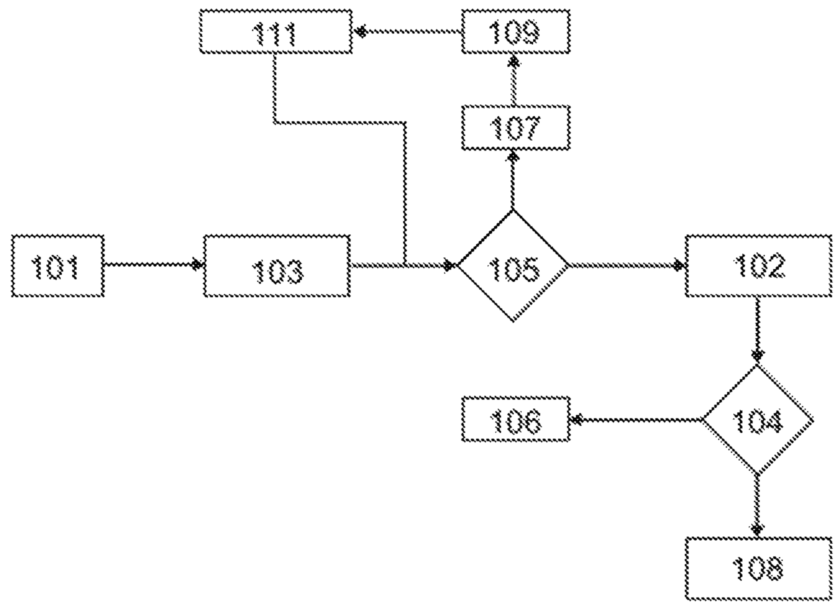
FIG. 10 shows a status diagram of a packet decoder that generates a digital DALI packet from the clocked signal at the second interface.

Finally, FIG. 10 shows a status diagram of a software packet decoder 92 that generates a digital DALI packet from the clocked signal at the second interface 17.

In the state 101, the algorithm is in the idle state and waits for the detection of an edge in the signal. If an edge is detected in 103, then in 105, the algorithm checks whether all values have already been interrogated. If this is not the case, then after a short waiting time 107, in 109, the value is read in and, in 111, a preprocessing with respect to the Manchester coding with which the signal is coded then takes place. After the processing of the first value, the algorithm jumps again to the interrogation of whether there are further values that need to be processed. If further values are detected, then the processing loop is iterated again until no more further values are identified. If this is the case, in 102, all the interrogated values are subjected to a Manchester decoding in order to obtain the binary data.

These data are then checked for validity in 104 and are discarded in 106 in the event of errors having been identified. If a valid value is identified, then in 108 the data are packaged into a DALI packet and assigned to a DALI library in the circuit arrangement 1. The data can then either be used further in the circuit arrangement 1 itself or be conveyed further on the DALI bus 15.

Various embodiments specify a system having an LED driver and a sensor which, in conjunction with a small structural height, can be produced more cost-effectively and is simple to install and/or operate.

Various embodiments provide a circuit arrangement for operating light sources, including an input or inputting an input voltage, an output for outputting an output current, a first interface for controlling the circuit arrangement, and a second interface. The circuit arrangement is configured to set two different operating modes. In a first operating mode the circuit arrangement is configured to be controlled via the first interface and to receive information concerning the output current via the second interface and to correspondingly set the output current at the output. In a second operating mode the circuit arrangement is configured to be controlled and to receive the information about the output current to be set at the output via the first interface, and to receive information from a sensor via the second interface and to process said information.

Controlling the circuit arrangement here is taken to mean e.g. switching on and off the light sources connected to the circuit arrangement and dimming said light sources.

The solution according to various embodiments utilizes the second interface present in the circuit arrangement. The second interface is an LED set interface. Via the LEDset interface, the current intensity for the LED modules connected to the driver is set by way of the connection of an external resistor. However, this function is being replaced more and more by programming via the first interface, which is a DALI interface, or by way of NFC technology by means of software. The current values thus programmed have priority over the settings that would be stipulated via the resistor at the LED set interface. The embodiments utilize the LED set interface for the alternative connection of a light and presence sensor. This sensor periodically sends light values and presence events in digitally coded form to the circuit arrangement by modulating information by means of two different voltages via the LED set interface. The LED set interface simultaneously serves to supply energy to the sensor. The circuit arrangement automatically identifies the sensor connection as soon as the latter obtains corresponding messages. Since the LED set interfaces of different circuit arrangements are generally not permitted to be connected to one another, in order to prevent undesired current flows and shifting of voltage levels, a further circuit arrangement cannot simply be connected in parallel. Therefore, for the connection of a further circuit arrangement, the sensor has an additional interface, which is galvanically isolated via an opto coupler and via which the second circuit arrangement obtains identical information to the first circuit arrangement.

This configuration may have a number of effects:

a) The sensor utilizes the existing LED set interface and registers itself independently.

Effects:

No further interface required at the circuit arrangement.

If no sensor is connected, the normal LED set function for setting the LED module energization is maintained.

b) The sensor does not require its own electrical system supply; the supply is effected directly via the circuit arrangement.

Effects:

The structural height of the sensor can be reduced.

The standby power of the circuit arrangement/sensor system increases only minimally compared with that of the driver without a sensor.

c) By means of an additional passive, galvanically isolated interface at the sensor it is possible to connect a second driver.

Effect:

The solution is suitable even for luminaires having a relatively high luminous flux.

d) The first interface (DALI interface) of the driver remains available.

Effects:

Additional manual operation (switching/dimming/set-point value storage) can be realized via the connection of a pushbutton.

In a further development of the solution according to the invention, the combination of circuit arrangement and sensor can be incorporated into a DALI installation via the DALI line. In this case, the circuit arrangement additionally operates as a "DALI sensor coupler" and forwards the light and presence information of the connected sensor by way of corresponding DALI messages to a superordinate DALI control unit.

In various embodiments, the light sources are light emitting diodes or light emitting diode modules. Light emitting diode modules here are modules constructed on a printed circuit board and including a plurality of LEDs connected serially and/or in series and additional electronics that regulate the current requirement of the LEDs. The latter have a high efficiency and recently have also been exhibiting higher and higher light packets, such that more and more lighting objectives can be achieved with these light sources.

In various embodiments, the second interface includes a voltage source, which emits a predetermined voltage, and the second interface furthermore includes a measuring circuit for the voltage present at the second interface. Thus, it may be possible to realize both the LED set protocol and a digital protocol for receiving sensor data.

In various embodiments, the voltage source of the second interface acts like a voltage source only up to a specific output current of the second interface. This may ensure reliable operation in the mode for receiving digital data from a connected sensor.

In various embodiments, the voltage measured by the measuring circuit correlates with the output current at the output of the circuit arrangement. This measure may realize the LED set standard for setting the output current of the driver via a current setting resistor at the second interface.

In various embodiments, the second interface is configured to receive the information from the sensor digitally by identification of a clocked voltage change between two different voltages at the output of the second interface. Clocked voltage change here means impressing digital information by impressing two different voltage levels into the output of the second interface. In this regard, a first, higher voltage of e.g. 5 V (=binary 0) and a second voltage of e.g. 2.7 V (=binary 1) of the second interface can represent digital states via which information is transmitted bit by bit. In this case, it is possible to use various digital coding methods such as e.g. Manchester coding. This may ensure a continuous voltage supply of the sensor.

Thus, the voltage source of the second interface can serve for supplying energy to the sensor. By virtue of the fact that two different voltage levels can be used for the transmission of information, during the entire transmission duration of the transmission of digital information energy may be simultaneously transmitted to the sensor in order to supply energy to the sensor.

In various embodiments, a voltage of 2.7 V at the second interface represents a logic one and a voltage of 5 V of the second interface represents a logic zero. With these two voltage levels, it may be possible simultaneously to ensure the current supply of the sensor and, on the other hand, to ensure simple and reliable identification of the digitally transmitted values.

Various embodiments provide a sensor for connection to a circuit arrangement. The sensor includes a first interface for transmitting information detected by the sensor to the circuit arrangement. The sensor is configured to transmit the sent information digitally by way of binary signals at the first interface. The sensor is configured to be supplied with current via this first interface. By virtue of the combined transmission of data and the current supply of the sensor, the entire arrangement is advantageously very efficient in terms of energy consumption and additional component parts and terminals on the part of the circuit arrangement and on the part of the sensor are likewise obviated.

In various embodiments, the sensor includes a galvanically isolated second interface for transmitting information to another circuit arrangement. Thus, two circuit arrangements such as e.g. LED drivers may be supplied with sensor information simultaneously. Since these can then react identically, this arrangement may be used in luminaires having high light packets, where one LED driver by itself is too weak in terms of power.

In various embodiments, the binary signals are formed by impressing of two different voltages at the first interface and/or the second interface. This may ensure reliable identification and at the same time reliable current supply of the sensor. In this case, the different voltages may e.g. advantageously be 2.7 V and 5 V. Since the sensor requires 2.7 V for its voltage supply, it can be continuously supplied with current via the interface and the energy efficiency of the entire arrangement increases.

In another embodiment, a voltage of 2.7 V at the first interface and/or the second interface represents a logic one and a voltage of 5 V at the first interface and/or the second interface represents a logic zero. One effect of this measure may be that the digital values can be transmitted particularly simply and reliably.

In various embodiments, the sent information constitutes brightness values of the light measured by the sensor. It is thus possible to realize a daylight-dependent light regulation that saves energy.

In a further embodiment, the sent information constitutes presence events measured by the sensor. With this information, the light may be switched off or dimmed in the absence of persons, in order to save further energy.

LIST OF REFERENCE SIGNS

1 Circuit arrangement
2 Superordinate DALI controller
5 LED module
7 Sensor
11 Input of the circuit arrangement
13 Output of the circuit arrangement
15 First interface
17 Second interface
57 Interface of the LED module
71 First interface of the sensor 7
73 Galvanically isolated second interface of the sensor 7
711 Curve of the voltage at the output of the second interface 17
731 Curve at the analog-to-digital conversion input ADC
91 Signal processing logic
93 Low-pass filter
95 LED set current signal
92 Packet decoder
94 Data packet
101 Idle state of the algorithm
102 Manchester decoding
103 Signal edge identified
104 Checking whether data are valid
105 Interrogating whether all values have been input
106 Discarding the data packet
107 Delay loop
108 Packaging and sending the data packet as a DALI packet
109 Reading in the signal value
111 Manchester preprocessing
ADC Analog-to-digital conversion input While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement for operating light sources, comprising:
an input for inputting an input voltage;
an output for outputting an output current;
a first interface for controlling the circuit arrangement;
a second interface;
wherein the circuit arrangement is configured to set two different operating modes:
in a first operating mode the circuit arrangement is configured to set the output current at the output based on a received output current information from the second interface; and
in a second operating mode the circuit arrangement is configured to set the output current at the output based on a received output current information from the first interface, and to receive sensor information from the second interface and to process the sensor information.

2. The circuit arrangement of claim 1,
wherein the light sources are light emitting diodes or light emitting diode modules.

3. The circuit arrangement of claim 1,
wherein the second interface comprises a voltage source, which emits a predetermined voltage, and a measuring circuit for the voltage present at the second interface.

4. The circuit arrangement of claim 3,
wherein the voltage source of the second interface acts like a voltage source only up to a specific output current of the second interface.

5. The circuit arrangement of claim 4,
wherein the voltage measured by the measuring circuit correlates with the output current at the output of the circuit arrangement.

6. The circuit arrangement of claim 4,
wherein the circuit arrangement is configured to receive the information from the sensor digitally by identification of a clocked voltage change between two different voltages at the output of the second interface.

7. The circuit arrangement of claim 6,
wherein the voltage source serves for supplying energy to the sensor.

8. The circuit arrangement of claim 6,
wherein a voltage of 2.7 V at the second interface represents a logic one and a voltage of 5 V at the second interface represents a logic zero.

9. A sensor for connection to a circuit arrangement,
the circuit arrangement comprising:
an input for inputting an input voltage;
an output for outputting an output current;
a first interface for controlling the circuit arrangement;
a second interface;

wherein the circuit arrangement is configured to set two different operating modes:

in a first operating mode the circuit arrangement is configured to set the output current at the output based on a received output current information from the second interface; and in a second operating mode the circuit arrangement is configured to set the output current at the output based on a received output current information from the first interface, and to receive sensor information from the second interface and to process the sensor information;

the sensor comprising:

a first interface for transmitting information detected by the sensor to the circuit arrangement;

wherein the sensor is configured to transmit the sent information digitally by way of binary signals at the first interface; and wherein the sensor is configured to be supplied with current via the first interface.

10. The sensor of claim 9, further comprising:

a galvanically isolated second interface for transmitting information to another circuit arrangement.

11. The sensor of claim 9, wherein the binary signals are formed by impressing of two different voltages at at least one of the first interface or the second interface.

12. The sensor of claim 11, wherein the different voltages are 2.7 V and 5 V.

13. The sensor of claim 11, wherein a voltage of 2.7 Vat at least one of the first interface or the second interface represents a logic one and a voltage of 5 V at the first interface and/or the second interface represents a logic zero.

14. The sensor of claim 9, wherein the sent information constitutes brightness values of the light measured by the sensor.

15. The sensor of claim 9, wherein the sent information constitutes presence events measured by the sensor.

* * * * *